United States Patent
Hopcraft et al.

(10) Patent No.: US 10,082,556 B1
(45) Date of Patent: Sep. 25, 2018

(54) NETWORK TABLE ERROR DETECTION AND CORRECTION USING ANALYTICS DATA

(71) Applicant: NetScout Systems, Inc, Westford, MA (US)

(72) Inventors: Geoff Hopcraft, Piedmont, CA (US); Nathaniel Hunt, Berkeley, CA (US); Michael Wright, Dallas, TX (US)

(73) Assignee: NetScout Systems, Inc, Westford, MA (US)

( * ) Notice: Subject to any disclaimer, the term of this patent is extended or adjusted under 35 U.S.C. 154(b) by 0 days.

(21) Appl. No.: 15/647,967

(22) Filed: Jul. 12, 2017

(51) Int. Cl.
| | |
|---|---|
| *H04W 4/029* | (2018.01) |
| *G01S 5/02* | (2010.01) |
| *H04W 64/00* | (2009.01) |
| *H04W 4/02* | (2018.01) |

(52) U.S. Cl.
CPC ......... *G01S 5/0252* (2013.01); *H04W 64/006* (2013.01); *H04W 4/025* (2013.01); *H04W 4/029* (2018.02)

(58) Field of Classification Search
CPC ... G01S 5/0252; H04W 64/006; H04W 4/029; H04W 4/028; H04W 4/025
See application file for complete search history.

(56) References Cited

U.S. PATENT DOCUMENTS

| | | | |
|---|---|---|---|
| 6,958,979 B2 | 10/2005 | Bulick et al. | |
| 9,253,663 B2 | 2/2016 | Raleigh et al. | |
| 2012/0166869 A1* | 6/2012 | Young | G06F 11/008 714/15 |
| 2016/0262681 A1* | 9/2016 | Patterson | A61B 5/165 |

* cited by examiner

*Primary Examiner* — Chuong A Ngo
(74) *Attorney, Agent, or Firm* — Locke Lord LLP; Scott D. Wofsy; Christopher J. Capelli (57) ABSTRACT

A system for correcting network planning data includes a planning repository containing information related to network traffic, network element locations and network element connectivity. The system further includes a repository that includes a plurality of call data records. In addition, the system includes an information processing system including a processor and a memory device coupled to the processor. The memory device contains a set of instructions that, when executed by the processor, cause the processor to receive location data associated with a wireless network cell from a plurality of devices connected to the wireless network. The set of instructions further causes the processor to identify call data records associated with the received location data and to compare information in the received location data with corresponding information stored in the identified call data records to identify errors in the information stored in the planning repository.

14 Claims, 3 Drawing Sheets

NETWORK TABLE ERROR DETECTION AND CORRECTION USING ANALYTICS DATA

FIELD OF THE INVENTION

This specification is directed, in general, to mobile communications, and, more particularly, to network table error detection using analytics data.

BACKGROUND OF THE INVENTION

Typically, mobile communication systems are cellular systems, i.e. a coverage area of a mobile communication network is made up of cells, the coverage area of each cell being covered by one base transceiver station and the cells usually slightly overlapping with surrounding cells. Network operators control a mobile communication system by means of one or more network management systems (NMS). Each cell in a cellular network should be identified individually in order for the NMS to be able to control and monitor the mobile communication network in order to enable cell-specific services of the mobile communication systems to be provided and in order to enable mobile devices to check whether or not they have user rights to the services. Cellular network operators maintain a database of information about the transmitting elements in their network. Information stored in such database may come from variety of sources, including various intelligent network planning tools. The database may contain information on network traffic, component locations, and component connectivity.

Previous studies across a variety of operators have shown that the planning data, while roughly correct, will typically have a significant number of errors. Measuring accurately a time-delay for the uplink and downlink data often proves to be difficult. In addition, site acquisition difficulties, network maintenance, tool migration and acquisitions can all cause variance between the plan and the actual installation. In practice, tests in various markets have shown between tens and hundreds of meaningful errors per market.

Detecting these errors is normally very time consuming and requires performance of numerous verification tests to assure the accuracy of the planning data. Accordingly, there is a need for an improved method of network table error detection.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system for correcting network planning data includes a planning repository containing information related to network traffic, network element locations and network element connectivity. The system further includes a repository of a wireless network that includes a plurality of call data records. In addition, the system includes an information processing system including a processor and a memory device coupled to the processor in communication with the planning database and with the repository of the wireless network. The memory device contains a set of instructions that, when executed by the processor, cause the processor to receive location data associated with a wireless network cell from a plurality of devices connected to the wireless network. The location data from each device includes a unique identifier and a timestamp. The set of instructions, when executed by the processor, further causes the processor to identify one or more call data records associated with the received location data based on the unique identifier and the timestamp information and to compare information in the received location data with corresponding information stored in the identified one or more call data records to identify one or more errors in the information stored in the planning repository.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. In addition, the present invention is not described with reference to any particular programming language. It will be appreciated that a variety of programming languages may be used to implement the embodiments of the present invention as described herein, and any references below to specific languages are provided for disclosure of enablement of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments of the present invention relate to monitoring performance of a wireless communications network and automatically correcting network data stored in a planning repository. In many wireless communications networks, operators typically maintain various network related information that comes from various sources, including various network planning tools. However, such data may have multiple timing and/or positioning errors. Such errors may include, for example, timing errors in the software or hardware of the wireless equipment vendor or timing errors due to feeder cable or filter delays between the base station and its transmitting antenna. Accurate knowledge of both antenna location and Radio Frequency (RF) feeder cable length between a base station and its antenna in a cellular radio system are necessary for the implementation of location based services. As another non-limiting example, the planning database may contain location errors in the position of at least one cell tower. In addition, at least some azimuthal errors due to cross-feeder and/or due to compromised installation or incorrect planning data, as well as elevation errors may compromise data integrity. To correct errors in the repository of a wireless communication network containing both legacy and modern Radio Access Technology (RAT), an information processing system dedicated to error correction is configured to analyze a plurality of call data records and timing advance data to identify at least some errors. However, this method may only detect fairly large scale errors. For example, typically, it may be very difficult to identify positioning errors of about 30 meters or less by using only call data record data. Depending on errors, a network monitoring system extracts different sets of information, removes redundant information, and focuses on means for automatic detection of planning data errors without recourse to large-scale drive tests, which can be expensive to implement across a number of cell locations across a defined geographical area (e.g., a city).

In an embodiment of the present invention, the network monitoring system may collect and analyze a subset of stored call data records. The network monitoring system may compare information in the call data records with corresponding information stored in the planning repository. Advantageously, call data records information may be analyzed in conjunction with some additional information data points from user's devices (e.g., GPS information from user's phones, driving information data set, etc.) in order to get much more precise location information. The performed analysis enables automatic identification of positioning errors less than 100 meters, azimuthal positioning errors, and cable feeder-related errors in the information stored in the planning repository. Hence, the network monitoring system can facilitate more efficient, uniform and effective planning data correction.

Figure 1:
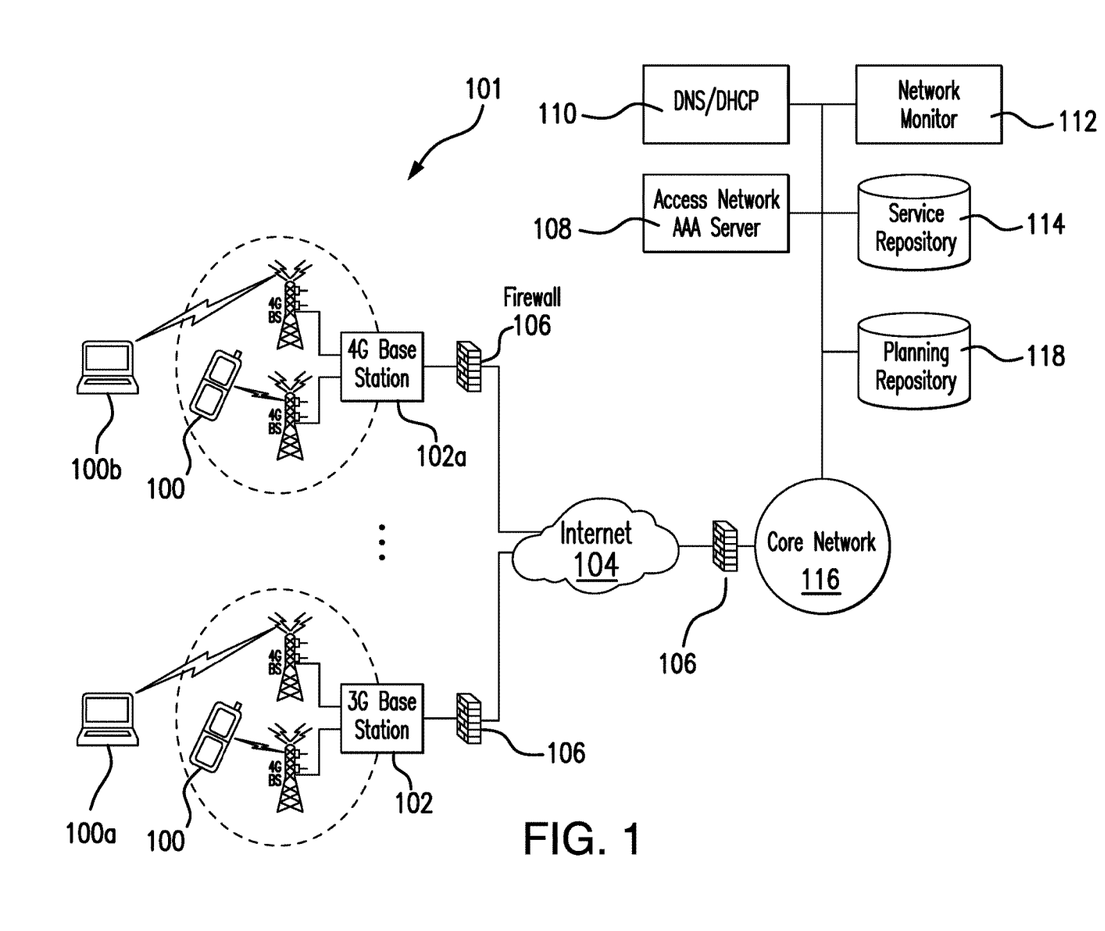
FIG. 1 illustrates simplified wireless communication network architecture in accordance with some embodiments of the present invention.

FIG. 1 illustrates simplified network architecture in accordance with some embodiments. As shown, this provides for a simplified service infrastructure that exemplifies a simplified and "flattened" network architecture in accordance with some embodiments that is advantageous for wireless network architectures. This also reduces the need for complex data path protocol interaction between the base station and network infrastructure. For example, in contrast to a complex edge and core network infrastructure connecting base stations to the central service provider network, as shown the base stations 102 are connected directly to the Internet 104 via firewalls 106 (in some embodiments, the base stations 102 include the firewall functionality 106). Base station control plane communication for access network AAA (Authentication, Authorization, and Accounting) server 108, DNS/DHCP (Domain Name System/Dynamic Host Configuration Protocol) server 110, mobile network monitor 112 or other necessary functions are accomplished, for example, with a secure IP tunnel or TCP connection between the central provider network and the base stations. The base station 102 is used to refer to multiple base station embodiments where the base station itself is directly connected to the RAN, or where the base station connects to a base station controller or base station aggregator function that in turn connects to the RAN, and all such configurations are collectively referred to herein as base station 102 in FIG. 1 and most figures that follow that reference base station 102 as described below.

Base stations 102a in 4G network may also be referred to as an eNodeB, a node B, an access point, and the like. Each eNodeB 102a may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB 102*a* may provide communication coverage for a macro cell, a pico cell, a femto cell, and/or other types of cell. A macro cell generally covers a relatively large geographic area (e.g., several kilometers in radius) and may allow unrestricted access by devices 100 (also sometimes and interchangeably referred to herein as user equipment) with service subscriptions with the network provider. A pico cell would generally cover a relatively smaller geographic area and may allow unrestricted access by devices with service subscriptions with the network provider. A femto cell would also generally cover a relatively small geographic area (e.g., a home) and, in addition to unrestricted access, may also provide restricted access by devices 100 having an association with the femto cell (e.g., devices for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. An eNodeB 102*a* may support one or multiple (e.g., two, three, four, and the like) cells.

As shown, the wireless network 101 is 3G, and 4G capable, the devices 100 can be either 3G, 4G or multi-mode 3G and 4G. Those of ordinary skill in the art will also appreciate that in the more general case, the network could be 2G, 3G, 4G and 5G capable, or the device could be 2G, 3G, 4G and 5G capable with all or a subset of Global System for Mobile (GSM), General Packet Radio Service (GPRS), Code Division Multiple Access (CDMA) 1×, High Speed Packet Access (HSPA), Evolution Data Optimized (EVDO), Long Term Evolution (LTE) and WiMax modem capability. If the devices are single mode, then the 3G devices 100*a* will be activated with a service profile that is consistent with the 3G network capacity and speed, and the 4G devices 100*b* will be activated with service profiles that are consistent with 4G network capacity and speed.

In some embodiments, if the base station data plane traffic is transmitted via the Internet 104 as discussed above, then IPDRs (Internet Protocol Detail Records, also sometimes and interchangeably referred to herein as Call Data Records or CDRs, which as used herein refer to any network measure of service usage or service activity for voice and/or data traffic (e.g., CDRs can include a time stamp, a device ID, and various levels of network measures of service usage for the device associated with that device ID, such as perhaps total traffic usage, network destination, time of day or device location)) are generated by and collected from the access network equipment. Depending on the specific network configuration, as discussed herein, for a WWAN network the CDRs can be generated by one or more of the following: base station 102, RAN or transport gateways and AAA 108. In some access network embodiments, the CDRs are transmitted to equipment functions that aggregate the CDRs for the purpose of service billing and other functions. As discussed below, it is often the case that the IPDRs are assumed to be obtained from the AAA server 108 and/or a service repository 114 (e.g., a real-time service usage collection stored in a database or a delayed feed service usage collection stored in a database), or some other network function. However, this does not imply that the CDRs may not be obtained from a variety of other network functions. In some embodiments, existing CDR sources are utilized to obtain network based service usage measures for multiple purposes. In some embodiments it is advantageous to take advantage of network based service monitoring or control for those service aspects the network is capable of supporting, while using device assisted service monitoring or control for the service aspects advantageously implemented on the device.

In some embodiments, where base station data plane traffic is backhauled and concentrated in a core network 116, the CDRs can originate in the base stations or a router or gateway in the core network 116, and the CDRs are collected at the AAA server 108 and stored in the service repository 114. As discussed below, it is assumed that the CDRs are obtained from the AAA server 108, and it is understood that the source of the CDRs is interchangeable in the embodiments.

In some embodiments, the CDR information is used by the mobile network monitor 112 and/or other network apparatus or device apparatus to implement planning data correction as described below. In some embodiments, a CDR feed flows between network elements. For example, a CDR feed can flow from a RAN gateway (not shown in FIG. 1) and a transport gateway (not shown in FIG. 1). In other embodiments, the CDRs originate and flow from the base station 102 or some other component/element in the network. In some embodiments, one or more of these CDR feeds is transmitted to a CDR aggregation function. For example, this aggregation function can be located in the AAA server 108, in the mobile network monitor 112, or in some other network element. This aggregation function collects the CDR feeds into a database with an entry for each device 100. At some point in time (e.g., at the end of a specified time period, at the end of a device network connection session and/or at a specified time of day), the CDR aggregation function sends summary information or detailed information of the CDRs for a given device or group of devices to the service repository 114.

Generally, prior to operating a wireless network, such as the wireless network 101 shown in FIG. 1, a network planning stage typically takes place over a sequence of study periods. The configuration and loading of the planned network are stored in a planning database, shown generally as planning repository 118. In a preferred embodiment, the planning repository 118 and service repository 114 are implemented using at least one relational database, such as ORACLE from Oracle Corporation. The planning repository 118 includes information on network component connectivity. For instance, such information may describe the core network connectivity between base stations 102 and network elements connected to each base station 102. Information stored in the planning repository also includes the location of each component in network 101 together with geographic information. In an embodiment, component geographic location is specified using V and H coordinates as is well known in the telecommunication art.

According to embodiments of the present invention, in addition to CDR information and information stored in the planning repository 118, the network monitor 112 is configured to analyze location data. Location data, as used herein, comprises any type of location identifying data that will be readily known to a person skilled in the art. Examples of location data include geographic location data such as geo-coordinate data (latitude/longitude) and geo-spatial data (latitude/longitude/altitude), cartographic position or map data such as city or street address, and the like.

Location data for mobile devices 100 may be determined using a variety of device-based or network-based positioning methods known in the art for identifying location of a mobile device. A person skilled in the art will readily understand that different methods can identify a location of a mobile device with differing levels of accuracy.

In some embodiments, location data may be determined using geosystem signals such as GPS (Global Positioning System), Galileo, GLONASS, Beidou and the like. For example, the mobile devices 100 may be associated with a GPS receiver for determining location based on the received GPS satellite signals.

In some embodiments, location data may be determined using network signals such as cellular carrier signals, WLAN signals, and the like. For example, location data for the mobile device may be determined using radiolocation, cell detection or triangulation techniques. As another example, the identity (and location) of the cell tower handling the device's communications can be used as a proxy for the location of the device. Examples of such network-based techniques for determining location data include but are not limited to cell identification, Enhanced Cell Identification, Time of Arrival (TOA), Angle of Arrival (AOA), Uplink Time Difference of Arrival (U-TDOA), Enhanced Observed Time Difference (E-OTD), and the like. In some embodiments, location data may be determined using signals received from a Wi-Fi access point.

In some embodiments, one or more methods may be used by the network monitor 112 to determine location data for a mobile device. The method used to determine location data may be based at least in part on the availability of signals. In some embodiments, location data may be determined using either or both device-based and network-based methods. Examples of hybrid location determination systems using device-based and network-based positioning techniques include Wide Area Augmentation System (WAAS), Assisted-GPS (A-GPS) and the like.

Figure 2:
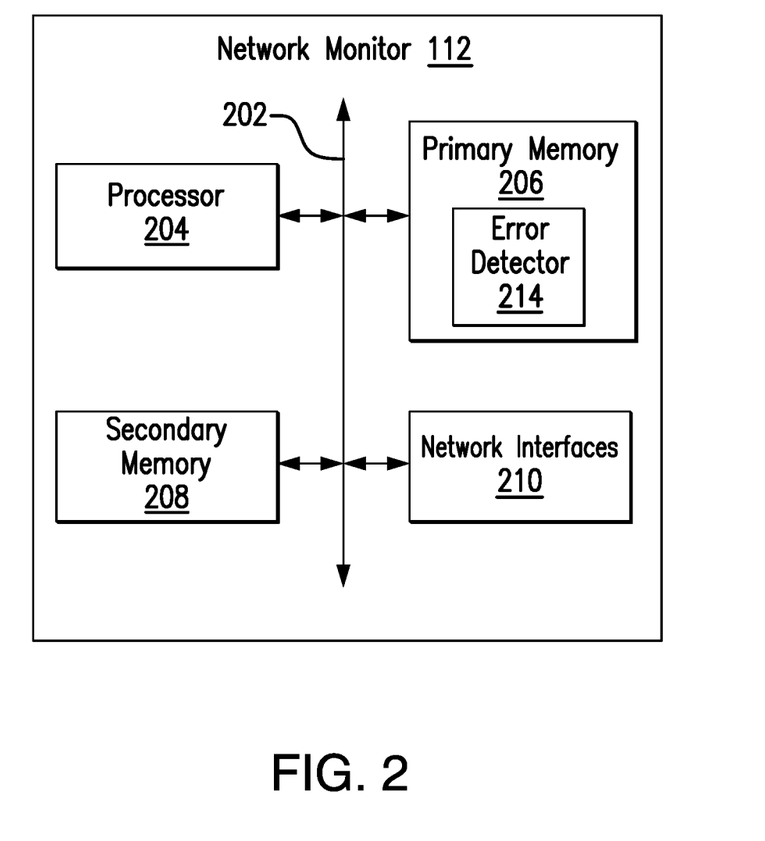
FIG. 2 is a block diagram of the network monitor of FIG. 1, according to one embodiment of the present invention.

FIG. 2 is a block diagram of the network monitor 112, according to one embodiment of the present invention. The network monitor 112 may include, among other components, a processor 204, primary memory 206, secondary memory 208, and one or more network interface(s) 210. These components are connected and communicate via a bus 202. The network monitor 112 may also include other components not illustrated in FIG. 2, such as user input devices (e.g., keyboard and mouse) and display devices (e.g., a display driver card).

The processor 204 executes computer instructions stored in the primary memory 206 and/or the secondary memory 208. Although only a single processor is illustrated in FIG. 2, two or more processors may be used to increase the computing capacity and the processing speed of the network monitor 112.

The primary memory 206 is a computer readable storage medium that stores, among other data, computer instruction modules for processing, storing and retrieving network traffic data and location data. The primary memory 206 may be implemented in various data storage devices (e.g., Random-Access Memory (RAM)) having a faster access speed compared to the secondary memory 208.

The secondary memory 208 may be a secondary storage device for storing, among others, the processed network planning data sets. The secondary memory 208 may be embodied, for example, as a solid-state drive, hard disk or other memory devices capable of storing a large amount of data compared to the primary memory 206.

The network interfaces 210 may include a NIC (network interface card) or other standard network interfaces to receive CDR data sets. For example, the network interfaces 210 may be an Ethernet interface, a Wi-Fi (IEEE 802.11) interface or other types of wired or wireless network interfaces. In one embodiment, two or more network interfaces are used to communicate with different types of networks or perform specialized functions.

In one embodiment, the network interface 210 sends the call data record sets and location data directly to an error detector 214. The network interface 210 may send one data set of CDR data and location data to the error detector 214 for processing and another CDR data set and location data set for storing in the secondary memory 208. Alternatively, the network interface 210 may send the data to the error detector 214 and not to the secondary memory 208. That is, the error detector 214 receives the CDR and location data sets from the network interface 210, analyzes the received information and compares the analyzed information with corresponding information stored in the planning repository, identifies one or more errors based on the analysis and sends the corrected information to the secondary memory 208. By receiving the CDR and location data directly from the network interface 210, the error detector 214 can process the CDR and location data at a high speed without delays associated with accessing the secondary memory 208.

Figure 3:
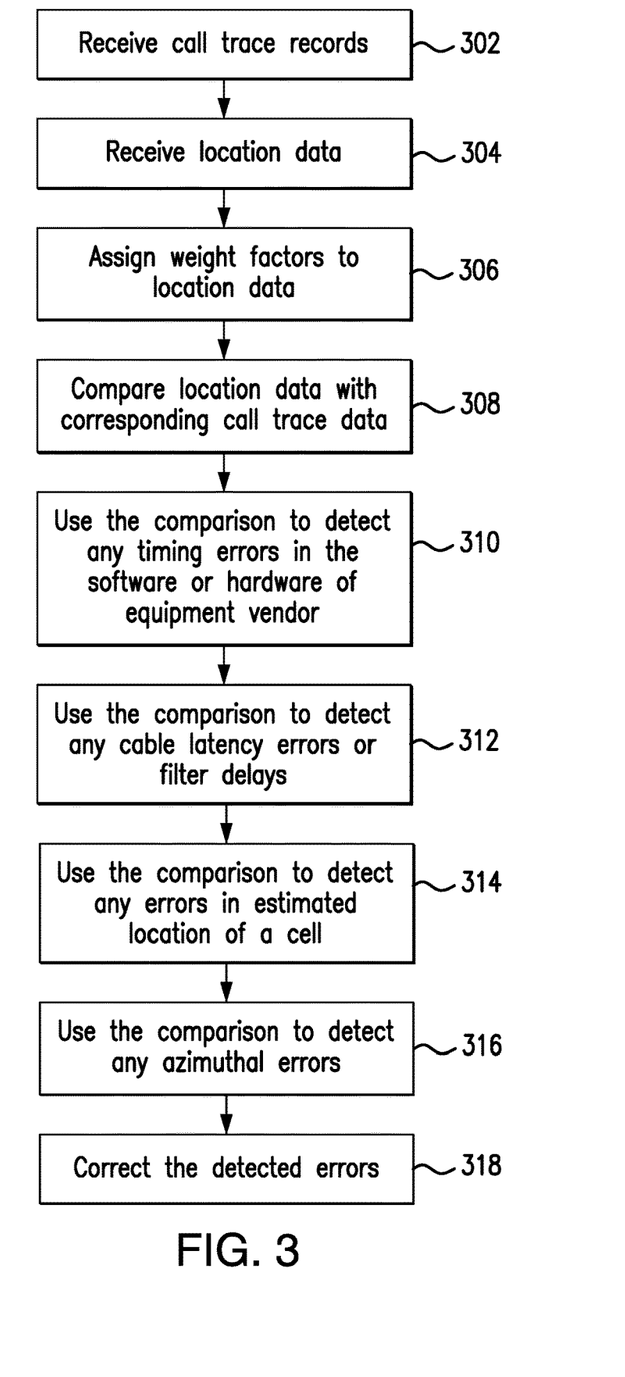
FIG. 3 is a flowchart illustrating method for correcting network planning data in a wireless communication network, in accordance with illustrative embodiments of the present invention.

FIG. 3 is a flowchart illustrating a method for correcting network planning data in a wireless network, in accordance with illustrative embodiments of the present invention. Before turning to description of FIG. 3, it is noted that the flow diagrams shown therein is described, by way of example, with reference to components shown in FIGS. 1-2, although these operational steps may be carried out in any system and are not limited to the scenario shown in the aforementioned figure. Additionally, the flow diagram in FIG. 3 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

According to an embodiment of the present invention, at step 302, the error detector 214 receives a subset of CDRs from the service repository 114. As noted above, the CDRs are transmitted to equipment functions that aggregate the CDRs for the purpose of service billing and other functions. The profile is a filter having certain criteria configured by a user that defines communication events to be captured by CDRs.

At step 304, the error detector 214 receives location data associated with a plurality of wireless network cells from a plurality of mobile devices 100 connected to the network 101. At least some of the mobile devices 100 may include a mobile location data module for obtaining data related to a mobile location or geographical position of the mobile device, such as GPS specific location of the mobile device or the cellular tower signal strength of surrounding cellular towers, or the signal strength of surrounding WLAN spots. The mobile device 100 may continuously gather and store mobile location data and signal strength data and then communicate the mobile location data to the network monitor 112 via the wireless network 101. Because transmitting information can be energy costly, the device may send updates when it has access to an accurate location (e.g. GPS) to update the dynamic map, and occasionally when it does not have access to GPS. In one embodiment, the network monitor 112 may store and process the location data to build a dynamic map of mobile locations.

In an embodiment, the error detector 214 may accumulate mobile location data samples to create a map of mobile devices within the area and their GPS positions relative to cellular towers and/or WLANs and signal strengths. As the sampled data points are accumulated by the error detector 214, it may process the samples and add them to service repository 114 to generate a continuous mapping and a dynamic view of the cellular landscape. Various operational aspects of the error detector 214 may be controlled through its user interface.

According to an embodiment of the present invention, at the next step (step 306), the error detector 214 then analyzes the obtained location data samples to correlate one or more weight factors for location data of interest for at least one time period of interest based on user-configurable criteria. In some embodiments, the assessed location(s) may include an average of the locations for a plurality of the wireless devices (providing data samples) of the group, possibly weighted by one or more attributes of the data samples (e.g., age, such as to give greater weight to newer data samples, and/or source or type of the location data sample, such as to vary the weight for data samples from newer versus older data sources or from other network elements so as to give greater weight to sources with higher expected reliability or availability) or by other factors. More details regarding location data assessment from obtained data samples are provided elsewhere.

Next, at step 308, the error detector 214 compares the obtained location data relative to corresponding call trace data of interest for at least one time period of interest that is stored in the service repository 114. The trace data of interest can include data stored during the time period of interest, after the time period of interest or both. In one embodiment, the error detector 214 may identify one or more call data records associated with the obtained location data of interest based on a unique identifier and/or timestamp included in the location data of interest. The error detector 214 can selectively access portions of the call trace data to ascertain accuracy of the obtained location data. For example, the error detector 214 can be programmed to determine a cell tower particular user equipment (UE) device is communicating with, as well as the power information and the timing information related to the corresponding UE-cell tower communication. The cell tower identifiers and corresponding signal strengths are stored in the identified call data records. In accordance with one embodiment, the error detector 214 may query the service repository 114 to identify a latitude and longitude for each cell tower, and thereafter use the latitude and longitude and the signal strength for each cell tower to calculate a location for the UE device using well-known triangulation techniques. Alternatively, the error detector 214 may query the service repository 114 with the latitude and longitude of each cell tower along with its corresponding signal strength and have the service repository 114 return location identifying information for all devices in communication with the cell tower, such as a calculated location of one or more mobile devices 100 expressed in the form of latitude and longitude coordinates, for example.

According to an embodiment of the present invention, once estimated physical location of one or more devices and network elements associated with the call data record(s) of interest are identified, the error detector 214 may determine an estimated physical distance between each of the identified devices and one or more network elements. Furthermore, in step 308, the error detector 214 may calculate a timing advance value based on the determined physical distance and compare the calculated timing advance value with a reported timing advance value included in the identified call data record. Generally, a network base station may utilize timing advance values to communicate with mobile devices 100b in communication with that base station 102a. Timing advance values are used by the mobile devices 100 to adjust for signal propagation delays that occur due to a number of factors, including differences in distance between the devices 100 and the base station 102a. Transmitting nodes (tower transmitters/transceivers) will have best coverage close to the transmitter, so in urban areas there will be a significant population of timing advance values closer to the serving cell.

According to an embodiment of the present invention, at step 310, the error detector 214 may employ a pattern filter configured to process the timing advance value data to detect whether any offset patterns indicative of timing errors in the software or hardware of mobile device equipment vendors are present in the received data. The pattern filter may discard timing advance data sets without patterns, leaving only data sets having detected patterns. The pattern filter may be configured to analyze the various types of data individually or in combination.

In one embodiment, at step 310, the error detector 214 reduces noise in the data set, for example to remove intermittent noise from the received timing advance data. The error detector 214 may employ any suitable system for filtering noise, such as spatial filtering, median filtering, or a convolution process on the received data.

Furthermore, in one embodiment, the error detector 214 may analyze the received data according to a pattern mining algorithm and in conjunction with one or more masks associated with known offset patterns indicative of timing errors in either software or hardware of the equipment vendors. In this exemplary embodiment, the error detector 214 utilizes spatial filtering, such as median filtering, to reduce noise, such as "salt-and-pepper" noise due to outliers in the data. In various embodiments, the pattern mask may utilize any appropriate simulated theoretical offset pattern indicative of a software/hardware error.

In most conventional mobile networks, timing delay of the signals transmitted between the wireless base station 102a and the wireless device 100 are employed in various location services methods, including, but not limited to, cell global identity and timing advance (CGI+TA), CGI and round trip time (CGI+RTT), time of arrival (TOA), and custom methods. Timing delay is affected by propagation delay in the wireless signal path among radio component(s) at the wireless base station and a sector antenna. Wireless signal path propagation delay can arise from various mismatches (e.g., impedance mismatch) among electronic elements and components, stray capacitances and inductances, length of the antenna(s) cable(s) in base station(s); tower height of base station, any signal path scattering, or "signal bounces," such as multipath or strong reflections, etc.; and the like. While propagation delay is typically assumed negligible with respect to timing delay, depending on the architecture of the serving base station and covered sector antenna(s) signal propagation delay can be substantive, particularly in distributed antenna systems and low-power wireless radio cells. Thus, utility of timing delay, or time-of-flight, data to provide estimates of a served mobile device location(s) can be substantially diminished. According to an embodiment of the present invention, at step 312, the error detector 214 may use the comparison of received location data and call data records data to detect any feeder cable propagation delays or filter delays. In one embodiment, the error detector 214 is configured to calculate timing advance values for a plurality of cells covering an area of interest and to compare the calculated timing advance values with the reported timing advance values in the identified call data records to identify offset values for each cell. Furthermore, at step 312, the error detector 214 may determine the median of offsets corresponding to the plurality of cells, and may determine the divergence of each cell offset from the median cell offset. In response to determining that a particular cell's offset deviates from the median cell offset by more than a pre-configured threshold value, the error detector 214 may identify this particular cell as having feeder cable propagation delays. As above, similar stable estimators other than median could be employed by the error detector 214 in any other suitable manner.

According to an embodiment of the present invention, the error detector 214 may further be configured to detect (at step 314) any potential errors in estimated location of a cell. For example, the error detector 214 may generate the predicted coordinates of each cell by using a location method known in the art as "trilateration." In general, according to the trilateration method, three estimated propagation delays of a signal travelling between a cell and three base stations, $\hat{d}_{1M}$ through $\hat{d}_{3M}$, can be calculated using the following equations (1):

$$\begin{cases} \hat{d}_{1M} = \sqrt{(\hat{x}_M - x_{B1})^2 + (\hat{y}_M - y_{B1})^2} \Big/ c \\ \hat{d}_{2M} = \sqrt{(\hat{x}_M - x_{B2})^2 + (\hat{y}_M - y_{B2})^2} \Big/ c \\ \hat{d}_{3M} = \sqrt{(\hat{x}_M - x_{B3})^2 + (\hat{y}_M - y_{B3})^2} \Big/ c \end{cases} \quad (1)$$

wherein c is the speed of light, which is also the speed of propagation of radio signals over the air; $(\hat{x}_M, \hat{y}_M)$ are the reference coordinates of the location of the cell; and $(x_{Bi}, y_{Bi})$ are the coordinates of the actual location of the $i^{th}$ base station, with i=1 to 3.

According to an embodiment of the present invention, at step 316, the error detector 214 may be configured to mathematically calculate a relative angular position of a device associated with each identified call data record relative to the physical location of the cell tower determined based on the corresponding cell tower identification data. For example, this step may involve error detector's 214 calculation of azimuthal error due to incorrect information stored in the planning repository for the wireless network. Such azimuthal errors may also occur due to cross-feeder or compromised installation.

More specifically, in one embodiment, at step 316, the error detector 214 may first filter out irrelevant call data records. For example, for each call data record included in the time period of interest, the error detector 214 may find the chronologically-nearest geolocation of a mobile computing device (e.g., a tablet or smartphone) within 30 seconds, for example, and may discard the call data record under evaluation if no such geolocations are found. In addition, the error detector 214 may employ additional distance filter which may be configured to detect and discard all trace records with actual distance less than a predetermined distance threshold (e.g., 100 meters). According to an embodiment of the present invention, using the remaining call data records, the error detector 214 calculates the relative azimuth (azimuth of the estimated location minus the bore site azimuth of the serving cell).

Furthermore, to perform azimuth correction at step 316, the error detector 214 may be configured to calculate the circular mean of a set of angles by accumulating separately the sum of the sines of the angles, the sum of the cosines of the angles and by calculating their mean values, as expressed by the following formulas (2) and (3). It should be noted that in order to avoid making azimuthal adjustments with insufficient data, in one embodiment, the error detector 214 may be configured to initialize the aforementioned sums of the sines and cosines with a predefined number of "prior" values with relative azimuth 0 and then add this relative azimuth for each call data record:

Mean of sines=Σ sin(azimuth)/(# of CDRs+p) (2)

Mean of cosines=(p+Σ cos(azimuth)/(#CDRs+p) (3)

where azimuth indicates the relative azimuth value and p indicates the predefined number of prior values (e.g., 100). Next, using values obtained using formulas (2) and (3), the error detector 214 may calculate the average angle as an arc tan; the average angle relationships as shown in the following formula (4) can be satisfied:

Average angle=arctan(Mean of sines/Mean of cosines) (4)

According to an embodiment of the present invention, the error detector 214 may also calculate a magnitude of the angle having a value ranging between 0 and 1, using the following formula (5):

Angle magnitude=
$\sqrt{\text{Meanofsines}^{}2 + \text{Meanofcosines}^{}2}$ (5)

Thus, the circular average comprising both an average angle and an angle magnitude indicates how uniform the average angular distribution is. It should be noted that in case of a perfectly uniform distribution of average angles the formula (5) gives a magnitude of 0 and a magnitude of 1 is achieved when all of the average angles are the same. According to an embodiment of the present invention, the error detector 214 may be further configured to update the previous azimuth value by (Average angle*Angle magnitude*x), where x represents the proportion of the error corrected per iteration. At least in some embodiments, the error detector 214 can leave uncorrected the original azimuth value in the planning repository 118.

At step 318, the error detector 214 may correct the errors detected in steps 310-316. For instance, the error detector 214 may update the estimated locations of the cells identified and calculated in step 314 in the planning repository 118.

Advantageously, the various embodiments described herein provide more efficient correction of planning data in wireless networks. Certain CDRs as well as location data received from a plurality of devices are used to identify errors (discrepancies) in planning data. Non-limiting examples of such errors may include timing errors in the software or hardware of the wireless equipment vendor or timing errors due to feeder cable or filter delays between the base station and its transmitting antenna. In the aforementioned embodiments, a system includes a planning repository that stores information on network traffic, network element locations and network element connectivity and a repository of a wireless network containing a plurality of CDRs and location data. An information processing system is also included that is configured to compare information in the CDRs with corresponding mobile device and network element location information to identify one or more errors.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for correcting network planning data, the system comprising:
    a planning repository comprising information on network traffic, network element locations, and network element connectivity;
    a repository of a wireless network comprising a plurality of call data records; and
    an information processing system comprising a processor and a memory device coupled to the processor in communication with the planning database and with the repository of the wireless network, the memory device containing a set of instructions that, when executed by the processor, cause the processor to:
        receive location data associated with a wireless network cell from a plurality of devices connected to the wireless network, the location data from each device including a unique identifier and a timestamp wherein the location data includes one or more of global positioning system (GPS) data, cell tower identification data, Galileo data, GLONASS data and data received from a Wi-Fi access point;
        identify one or more call data records associated with the received location data based on the unique identifier and the timestamp information; and
        compare information in the received location data with corresponding information stored in the identified one or more call data records to identify one or more errors in the information stored in the planning repository, including:
            determine a physical distance between a physical location of the device associated with the identified call data record and a physical location of a network element in communication with the device, wherein the physical location of the device and the physical location of the network element are determined based on the received location data; and
        calculate a timing advance value based on the determined physical distance; and
        compare the calculated timing advance value with a reported timing advance value included in the identified call data record.

2. The system of claim 1, wherein the set of instructions that cause the processor to receive location data further cause the processor to assign a weighting factor value to each subset of the received location data based on a data source and wherein the set of instructions that cause the processor to assign the weighting factor value further cause the processor to assign the weighting factor value that is lower for each subset of the location data received from a repeated data source as compared to a weighting factor value assigned to a subset of the location data received from a new data source.

3. The system of claim 1, wherein the set of instructions that cause the processor to compare information in the received location data with corresponding information stored in the identified one or more call data records further cause the processor to:
    determine the physical distance, calculate the timing advance value and compare the calculated timing advance value for a plurality of devices wirelessly connected to a plurality of network elements servicing a plurality of cells;
    median filter the timing advance values to identify patterns indicative of an error in timing software or hardware hosted by the plurality of devices; and
    identify one or more errors in the timing software or hardware hosted by the plurality of devices, in response to identifying one or more patterns.

4. The system of claim 1, wherein the set of instructions that cause the processor to compare information in the received location data with corresponding information stored in the identified one or more call data records further cause the processor to:
    determine the physical distance, calculate the timing advance values and compare the calculated timing advance values for a plurality of devices wirelessly connected to a plurality of network elements servicing a plurality of cells;
    calculate a median value based on a plurality of cell offsets corresponding to the plurality of cells;
    determine if deviation for each cell offset from the median value exceeds a predetermined threshold; and
    identify a cable latency error associated with the plurality of devices wirelessly connected to a cell, in response to determining that the offset deviation for the corresponding cell exceeds the predetermined threshold.

5. The system of claim 1, wherein the set of instructions that cause the processor to compare information in the received location data with corresponding information stored in the identified one or more call data records further cause the processor to:
    determine the physical distance, calculate the timing advance value and compare the calculated timing advance value for a plurality of devices wirelessly connected to a plurality of network elements servicing a plurality of cells;

determine a trilateration position value for each of the plurality of cells based on the received location data; and identify an error in estimated location of one or more of the plurality of cells, by comparing the trilateration position value for each of the plurality of cells with the estimated location value for each of the plurality of cells stored in the planning repository.

6. The system of claim 1, wherein the set of instructions that cause the processor to compare information in the received location data with corresponding information stored in the identified one or more call data records further cause the processor to determine a relative angular position of the device associated with the identified call data record relative to the physical location of the corresponding network element connected to the device.

7. The system of claim 6, wherein the set of instructions that cause the processor to determine the relative angular position of the device further cause the processor to identify an azimuthal error due to incorrect information stored in the planning repository based on the determined relative angular position of the device.

8. The system of claim 6, wherein the set of instructions that cause the processor to determine the relative angular position of the device further cause the processor to identify an azimuthal error due to cross-feeder.

9. A method for correcting network planning data in a wireless communication system, the method comprising steps of:

receiving location data associated with a wireless network cell from a plurality of devices connected to the wireless network, the location data from each device including a unique identifier and a timestamp wherein the location data includes one or more of global positioning system (GPS) data, cell tower identification data, Galileo data, GLONASS data and data received from a Wi-Fi access point;

identifying one or more call data records associated with the received location data based on the unique identifier and the timestamp information; and comparing information in the received location data with corresponding information stored in the identified one or more call data records to identify one or more errors in the information stored in a planning repository, wherein the planning repository stores information on network traffic, network element locations, and network element connectivity, including:

determining a relative angular position of the device associated with the identified call data record relative to the physical location of the corresponding network element connected to the device by identifying an azimuthal error due to incorrect information stored in the planning repository based on the determined relative angular position of the device wherein the azimuthal error is identified due to cross-feeder.

10. The method of claim 9, wherein the step of receiving location data further comprises assigning a weighting factor value to each subset of the received location data based on a data source and wherein the step of assigning the weighting factor value further comprises assigning the weighting factor value that is lower for each subset of the location data received from a repeated data source as compared to a weighting factor value assigned to a subset of the location data received from a new data source.

11. The method of claim 9, wherein the step of comparing information in the received location data with corresponding information stored in the identified one or more call data records further comprises steps of:

determining a physical distance between a physical location of the device associated with the identified call data record and a physical location of a network element in communication with the device, wherein the physical location of the device and the physical location of the network element are determined based on the received location data;

calculating a timing advance value based on the determined physical distance; and comparing the calculated timing advance value with a reported timing advance value included in the identified call data record.

12. The method of claim 11, wherein the step of comparing information in the received location data with corresponding information stored in the identified one or more call data records further comprises steps of:

determining the physical distance, calculating the timing advance value and comparing the calculated timing advance value for a plurality of devices wirelessly connected to a plurality of network elements servicing a plurality of cells;

median filtering the timing advance values to identify patterns indicative of an error in timing software or hardware hosted by a plurality of devices; and identifying one or more errors in the timing software or hardware hosted by the plurality of devices, in response to identifying one or more patterns.

13. The method of claim 11, wherein the step of comparing information in the received location data with corresponding information stored in the identified one or more call data records further comprises steps of:

determining the physical distance, calculating the timing advance values and comparing the calculated timing advance values for a plurality of devices wirelessly connected to a plurality of network elements servicing a plurality of cells;

calculating a median value based on a plurality of cell offsets corresponding to the plurality of cells;

determining if deviation for each cell offset from the median value exceeds a predetermined threshold; and identifying a cable latency error associated with the plurality of devices wirelessly connected to a cell, in response to determining that the offset deviation for the corresponding cell exceeds the predetermined threshold.

14. The method of claim 11, wherein the set of instructions that cause the processor to compare information in the received location data with corresponding information stored in the identified one or more call data records further cause the processor to:

determining the physical distance, calculating the timing advance value and comparing the calculated timing advance value for a plurality of devices wirelessly connected to a plurality of network elements servicing a plurality of cells;

determining a trilateration position value for each of the plurality of cells based on the received location data; and identifying an error in estimated location of one or more of the plurality of cells, by comparing the trilateration position value for each of the plurality of cells with the estimated location value for each of the plurality of cells stored in the planning repository.

* * * * *